(12) United States Patent
Zadok

(10) Patent No.: US 6,719,313 B2
(45) Date of Patent: Apr. 13, 2004

(54) STEERING CONTROLLED ANTI-ROLL AUTOMOBILE SUSPENSION

(75) Inventor: Adam Zadok, 6123 S. 56th CT., Cicero, IL (US) 60804

(73) Assignee: Adam Zadok, Cicero, IL (US)

( * ) Notice: Subject to any disclaimer, the term of this patent is extended or adjusted under 35 U.S.C. 154(b) by 56 days.

(21) Appl. No.: 10/098,864

(22) Filed: Mar. 15, 2002

(65) Prior Publication Data
US 2003/0184037 A1 Oct. 2, 2003

(51) Int. Cl.[7] .............................................. B60R 21/04
(52) U.S. Cl. ............................ 280/124.106; 280/5.506; 280/5.509; 280/5.51; 280/124.103
(58) Field of Search ................... 280/124.106, 124.103, 280/5.502, 5.506, 5.508, 5.509, 5.51, 6.16, FOR 133

(56) References Cited

U.S. PATENT DOCUMENTS

| | | | |
|---|---|---|---|
| 2,152,938 A | 4/1939 | Welch | 280/124.103 |
| 2,279,120 A | * 4/1942 | Hurley | |
| 2,757,938 A | 8/1956 | Crowder | |
| 4,546,997 A | 10/1985 | Smyer | 280/772 |
| 4,632,413 A | 12/1986 | Fujita et al. | 280/112 |
| 4,650,213 A | 3/1987 | Fujita et al. | 280/772 |
| 4,685,690 A | 8/1987 | Fujita et al. | 280/112 |

FOREIGN PATENT DOCUMENTS

FR        1082796     * 1/1955    ........ 280/FOR 133

OTHER PUBLICATIONS

Road & Track/As Clever as ABC, Mercedes Active Body Control. By Dennis Simanatis. Sep. 1999.pp. 140, 143, and 148.
Road & Track Online. Letter From Europe by Paul Frere. p. 62.
Honda Insight by Magazine <<Insight>>. Nov. 1999.p. 156.
Motor Trend Magazine. Jun. 1999. p. 138.

* cited by examiner

Primary Examiner—Eric Culbreth
(74) Attorney, Agent, or Firm—Gordon & Rees LLP

(57) ABSTRACT

An anti-roll suspension system for a vehicle, including a steer able axle assembly mounting a pair of laterally spaced wheels on a vehicle chassis, a spring assembly supporting the chassis on each of the axle assemblies, a lever attaching each spring assembly to the vehicle chassis, and a roll compensating linkage connected to the lever of each spring assembly and being responsive to a steering movement to the chassis to translate the steering movement to a vertical movement on the suspension of the chassis to simultaneously lift the outside turn side of the vehicle and lower the inside turn side of the vehicle thereby counteracting roll of the chassis when in a turn.

20 Claims, 5 Drawing Sheets

STEERING CONTROLLED ANTI-ROLL AUTOMOBILE SUSPENSION

BACKGROUND OF THE INVENTION

The present invention generally relates to automotive vehicle suspension systems, and pertains more particularly, to an automotive suspension system that is responsive to the vehicle steering to counter inertial forces on the vehicle chassis when in a turn to counteract and limit vehicle body roll.

DISCUSSION OF THE RELATED ART

Automotive vehicles have a body or chassis with an enclosed operator and passenger compartment with the body being resiliently supported by a suspension system on wheel assemblies that carry it over generally horizontal road and street surfaces. The vehicle may be driven by a drive train from the engine through the rear wheels, the front wheels or both. It typically has steerable front wheels and non-steerable rear wheels. The vehicle suspension system normally employs springs to support the body on the wheel assemblies, and with damping means in the form of hydraulic cylinders that act to dampen oscillations and movements of the body relative to the wheel assemblies.

The construction of the suspension system is often a compromise between a soft suspension for providing a soft comfortable ride for passengers over rough roads and a stiff suspension, which enhances the safety and stability of the vehicle, but is often uncomfortable for passengers. A stiffer suspension transfers more shock of the suspension to the chassis and offers less comfort to passengers but increases the stability of the vehicle. When the typical vehicle enters a turn the resulting centrifugal forces acting on the vehicle tends to roll the vehicle body about its roll center relative to the underlying suspension system. This centrifugal force also tends to displace the body laterally, outwardly tending to cause the vehicle to pivot about the contact of its outer wheels with the road surface.

The construction of a vehicle body and the configuration of the vehicle suspension systems determine the location of the roll center. In a conventional vehicle, the roll center of the vehicle is typically below the center of mass or gravity of the vehicle. Centrifugal forces tending to roll the vehicle body act on a lever arm or through a lever arm determined by the vertical distance between the center of gravity and the roll center. This is known as the roll couple.

Many of today's vehicles, particularly cars and minivans are designed with a taller body to maximize interior space. Other vehicles such as sports utility vehicles (SUV) are built higher on the suspension for ground clearance. These configurations exaggerated in the roll couple, particularly when the vehicle is loaded. When these vehicles are empty, the center of mass is typically lower than when loaded. As more occupants are seated in the vehicle the center of mass moves higher above the roll center. This reduces the stability of the vehicle, making it relatively unsafe when entering a turn at moderate to high speed.

As a vehicle moves through a turn the body tends to roll toward the outside of the turn and shift the weight onto the outer wheels and springs while simultaneously unloading the inner suspension springs thereby reducing the cornering traction of the vehicle. The body also tilts or rolls toward the outside of the curve shifting the center of mass of the vehicle toward the outside of the curve.

Rolling of the body about its roll center when negotiating a turn is discomforting to the operator and to the passengers. A stiffer suspension will tend to reduce this tendency to roll but, will also subject the passengers and operator to the jolting and jarring of rough roads. A number of approaches to overcoming this tendency of the vehicle to roll during cornering have been proposed in the past. One approach, in addition to a stiffer suspension, has been to provide the vehicle with anti-sway bars in the form of torsion bars between the two sides of the suspension. This approach helps reduce roll to some extent but has not been entirely satisfactory Another approach has been to provide the vehicle with linkage system powered by electric motors to selectively tilt the body of chassis and the wheels inwardly toward the inside of the curve during cornering. Several variations of such system are disclosed in U.S. Pat. Nos. 2,152,938; 4,632,413; 4,546,997; 4,650,213; and 4,685,690. These systems are complicated and expensive.

Other attempts at solving the cornering problems have provided for the wheels of the vehicle to tilt into a curve. These have been powered by various means such as electrical and hydraulic systems. One such system for tilting of the wheels that is powered or controlled by the steering of the vehicle is disclosed in U.S. Pat. No. 2,787,473. These systems are also complicated and expensive.

Others have attempted to overcome this problem by designing the suspension system so that the roll center of the vehicle is disposed above its center of its gravity. Most of these systems are also complicated and expensive. These systems also have other serious drawbacks. The inventor has provided suspension systems in co-pending patent applications wherein the suspension comprises an anti-roll linkage connected between the chassis and the moveable arm of the axles of the suspension system being responsive to a lateral force on the chassis to translate lateral force on the chassis to a vertical force on the down force side of the chassis so that the anti-roll linkage simultaneously applies a lifting force on the down force side (outside of the turn) of the vehicle and applies a lowering force on the up force side (inside of the turn)of the vehicle. However, these systems are not sufficiently simple and inexpensive for the average lower priced automobile.

Accordingly there is a need for an improved simple and inexpensive anti-roll suspension system that overcomes the above problems of the prior art for inexpensive automobiles.

SUMMARY OF THE INVENTION

The present invention solves the problem of excessive vehicle body roll. Broadly, the present invention provides a suspension system having a linkage that translates lateral body movement into a lift force on the down load side of the body.

More specifically, one embodiment of the invention comprises an anti-roll suspension for a vehicle chassis having at least two laterally spaced wheels, wherein the suspension comprises an axle assembly for rotatably mounting each of a pair of laterally spaced wheels, a spring assembly supporting the chassis on each of the axle assemblies, and an anti-roll linkage connected between vehicle steering system and the moveable arm of the axles of the suspension system being responsive to steering to translate steering of the vehicle to impose a vertical down force on the down force side (outside of turn) of the suspension so that the anti-roll linkage simultaneously loads the spring on the down force side of the vehicle and unloads the spring on the up force side (inside of turn) of the vehicle. However, the claims alone, not the preceding summary, define the invention.

BRIEF DESCRIPTION OF THE DRAWINGS

The nature, goals, and advantages of the invention will become more apparent to those skilled in the art after considering the following detailed description when read in connection with the accompanying drawings illustrating by way of examples the principles of the invention in which like reference numerals identify like elements throughout wherein.

Figure 1:
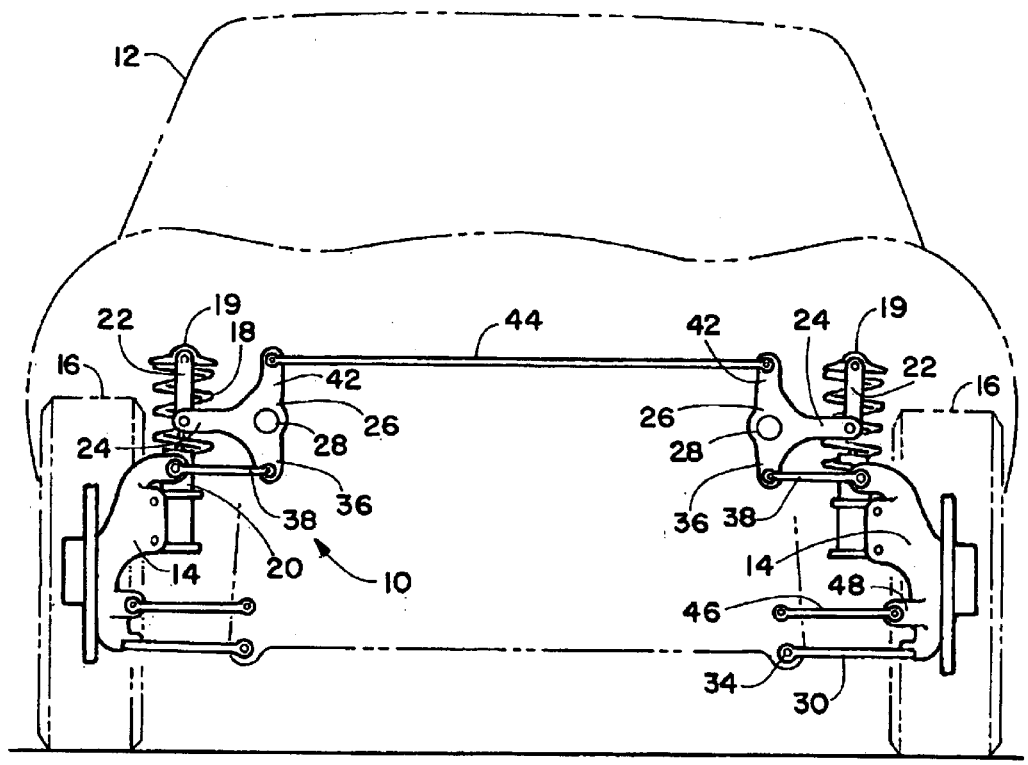
FIG. 1 is a front elevation view a vehicle shown in phantom showing the front of one embodiment of the invention showing the vehicle body in a static condition.

It will be recognized that some or all of the Figures are schematic representations for purposes of illustration and do not necessarily depict the actual relative sizes or locations of the elements shown.

DETAILED DESCRIPTION OF THE PREFERRED EMBODIMENTS

In the following paragraphs, the present invention will be described in detail by way of example with reference to the attached drawings. In the description, the parts and components of the present invention, which are the same, will be referred to by the same or similar reference numbers or symbols.

Unless defined otherwise, all technical and scientific terms used herein have the same meaning as is commonly understood by one of skill in the art to which this invention belongs. In the event the definition in this section is not consistent with definitions elsewhere, the definitions set forth in this section will control.

Throughout this description, the preferred embodiment and examples shown should be considered as exemplars, rather than as limitations on the present invention. As shown in the drawing for purposes of illustration, a suspension system according to the invention provides a loading of the down load side springs in response to a steering of the vehicle chassis such as in a turn to reduce or eliminate roll of the vehicle body. A suspension system according to the invention provides a more comfortable ride for operator and passengers by reducing or eliminating roll of the body as the vehicle negotiates turns. The suspension system of this invention is also simple and easily fabricated and installed with little or no alteration in existing vehicle design.

Figure 2:
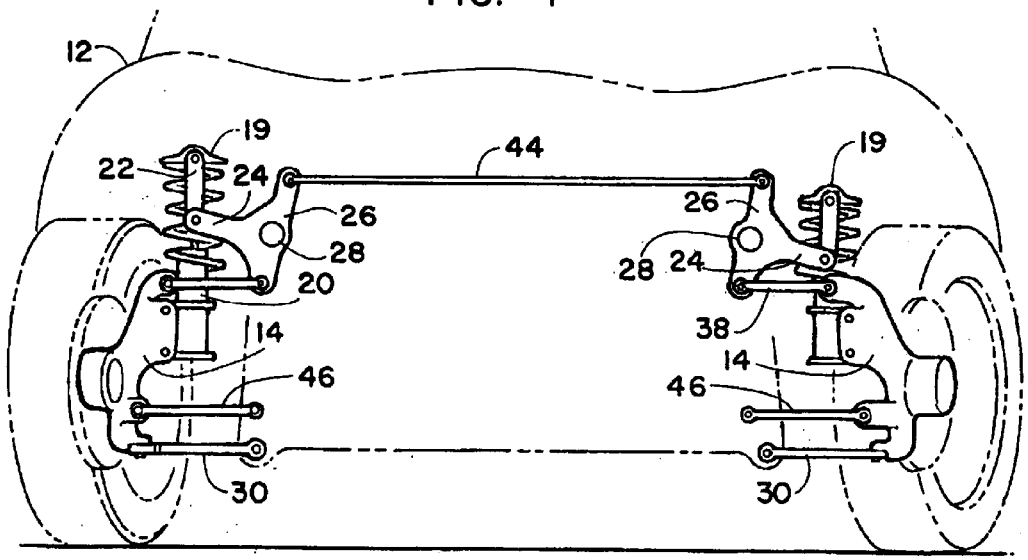
FIG. 2 is view like FIG. 1 showing the condition of the front suspension with the vehicle in a turn.
Figure 3:
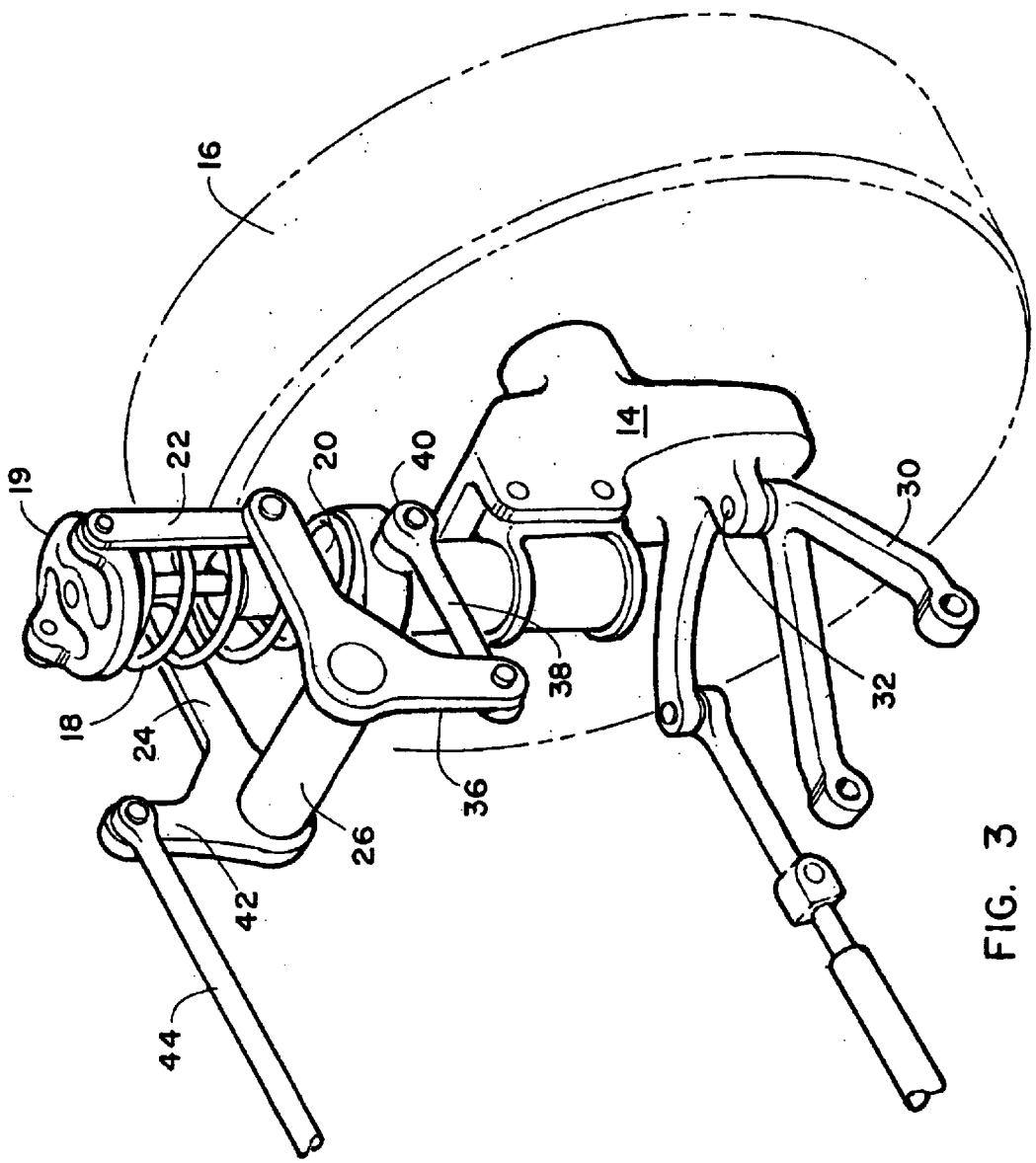
FIG. 3 is a a perspective view of one side of an alternate embodiment similar to that of FIG. 1; with steering input from the strut housing.

Referring to FIGS. 1–3, an anti-roll suspension system for a front suspension of a vehicle in accordance with one embodiment of the invention is illustrated and designated generally by the numeral 10. The suspension system is shown supporting the front of a typical automotive vehicle with the vehicle chassis or body designated generally by the numeral 12. The vehicle body or chassis may have any height over the suspension and any configuration. The anti-roll suspension system is devised for a vehicle chassis having two laterally spaced independently sprung steerable front wheels. The front wheels may be driven, even though the drive is not shown herein. The suspension system, as illustrated, comprises a McPherson strut that supports the chassis on an axle assembly 14 for independently and rotatably mounting each of a pair of laterally spaced wheels 16. However, the system is applicable to other type strut suspension systems.

The vehicle chassis 12 is supported on each of the axle assemblies by a McPherson strut that typically comprises a combination of a coil compression spring 18 and a hydraulic damping cylinder assembly 20. The spring rests on or is connected at its lower end on the axle and is connected at the top to the chassis so that it is compressed between the chassis and the axle by the weight of the chassis. The damper is connected in parallel with the spring with a lower end connected to the axle and an upper end connected to the spring and to the chassis. The spring and damper are connected together at the upper end by a plate or cap 19 so that the upper ends of both travel together.

The strut is directly secured at the lower end to axle 14 and connected at the upper end through a link 22 to an upper an arm 24 of bell crank or lever 26. Link 22 is connected at its upper end to plate or cap 19 and at its lower end to arm 24 of lever or bell crank 26. Bell crank 24 is pivotally connected by a suitable pivot pin or the like at 28 directly to the chassis or body of a vehicle. A lower control arm assembly or unit 30 is connected at an outer end at pivot 32 to wheel axle assembly 14 and pivotally connected at an inner end by pivot pin 34 to the vehicle chassis.

Bell crank 26 has a lower arm 36 connected by a link 38 to an arm 40 on the axle assembly to receive input force and movement from steering of the vehicle. An upper arm 42 is pivotally connected by a tie link 44 to an upper arm of bell crank lever 26 on the opposite side of the vehicle. This link is not necessary for the steering input but is necessary to tie the sides together for accommodating uneven road surfaces. A steering link 46 is connected to an arm 48 on the axle assembly and receives steering input from the steering system of the vehicle to turn the front wheels. This steering input rotates the axle assembly about the axis of the McPherson strut to turn or steer the vehicle. This linkage translates steering input to the vehicle to rotary movement of the axles which transfers a rotary movement to bell crank 26 to a movement of lever 24 to compress or relax spring 18.

Bell crank 26 rotates in response to any steering movement of the wheels of the vehicle chassis. This action loads the spring on the download or outside of a turn and unloads the spring on the upload on inside of the turn. This compensates for inertial or centrifugal forces on the vehicle chassis tending to roll the chassis about its roll axis. The opposite side of the vehicle chassis is supported on an identical suspension with all components identified by the same reference numerals. Connecting link or bar 44 is pivotally connected between each upper arm 42 of each bell crank of each wheel suspension assembly. This bar or link ties compensating linkage of both sides of the suspension system together to work together in countering any tendency of the chassis to roll when encountering uneven road surfaces. In the instant system the link serves to translate a movement of the chassis and the moveable arm of the axles of the suspension system to a vertical down force on the suspension on the down force side (outside of turn) of the chassis so that the anti-roll linkage simultaneously lift preloads the spring on the down force side of the vehicle and reduces the load on the spring on the up force side (inside of turn) of the vehicle. The system maintains the camber of the wheels substantially constant while applying a tilting force to the chassis acting against the centrifugal force that tries to roll the chassis toward the outside or down force side of a turn.

Turning to FIG. 2 a front elevation view illustrates the action of the suspension system of the present invention in a severe turn. The vehicle chassis, shown in a right turn, remains substantially level as the suspension system functions through the compensating linkage to maintain the vehicle chassis level as the vehicle passes through the turn. The turning movement of the vehicle steering wheel actuates the linkage with the movement translated by the linkage to action on the springs and a resultant maintenance of the chassis in a level condition as the vehicle passes through a turn. As will be appreciated the center of mass of the vehicle body or chassis will be above the center of axles 14 and in a severe right-hand turn as illustrated will tend to roll clockwise about its center of rotation. The center of rotation of the chassis will be located below the center of mass of the chassis.

Movement of the steering wheel of the vehicle to move it into a turn as illustrated (considered from the driver's point of view) will result in unloading the right hand spring and a lowering of the body or chassis on the right side relative to the axle of the vehicle and loading of the left hand spring and a raising of the chassis on the left side relative to the axle thereby imposing a down force to the left pivot connection 28 of the levers 26. Simultaneously an inertial or centrifugal force will be imposed to the left on the chassis attempting to roll it to the left or counterclockwise about its roll axis. These inertial or centrifugal forces will impose a counter-clockwise rotation or pivoting of the lever 26 about its pivot point 28 thereby imposing a downward force on the left-hand spring as viewed in by the driver, and an upward force on the arm 24 of the right-hand lever 26, unloading the right-hand spring 18. This action will simultaneously load the compression spring 18 on the left and unload the compression spring 18 on the right counteracting the tendency of the body of the vehicle to roll to the left.

As will be appreciated, compression springs increase in resistance with increasing displacement. Therefore, the greater displacement of the spring on the left increases the lift or support by that spring on the vehicle body. Simultaneously the extension of the spring on the right reduces the lift or support by that spring and simultaneously allows the right side of the body to remain in place or drop down thus reducing the roll of the body to the left. This results in a counteraction of the tendency of the vehicle to roll and thereby maintains the vehicle body or chassis substantially level as the vehicle goes through a turn. The response of the suspension to bumps or obstacles and depressions in the roadway is similar and maintains the vehicle body in a level condition.

Referring to FIG. 3, a perspective and more detailed view of one wheel of he suspension is illustrated. As seen, the strut is aligned with and may form part of the vertical turning axis of the wheel assembly. The lower control arm 30 has an A or V configuration with a pivot pin 32 connection to the axle that allows turning of the axle about the vertical steering axis. It also allows the axle to move vertically up and down in relation to the vehicle chassis. Bell crank 26 is formed with spaced horizontal arms 24 that extend to either side of the spring 18 and connect by a pair of links 22 to the plate or cap 19 which connects the spring and damper together in parallel. One lower arm 36 on one side of the bell crank is connected to one end of steering input link 38 which is connected at its other end to an arm on the strut to transmit turning input force from rotation of the strut to a down or up force on the spring. One upper tie bar or link 44 connects between arms 42 of the bell cranks of the two sides of the suspension system. These arms are shown as extending upward but, preferably extend downward parallel to arms 36, as will be subsequently illustrated. It will be seen that the suspension system wheel assemblies are tied together by tie link or bar 44 and will function together through the compensating linkage to maintain the vehicle substantially level when one wheel of the vehicle hits bumps or depressions in a road.

In operation, with reference to the right hand wheel and axle assembly as viewed from the front in FIGS. 2 and 3, movement of the steering wheel of the vehicle to move it into a right hand turn as illustrated (considered from the driver point of view) will move steering link 46 to the driver's right turning the axle assembly clockwise about its vertical axis. This turning of the axle assembly moves steering input link 38 to the right acting on lower arm 36 of bell-crank 26 rotating it counter clockwise about pivot 28. This rotation pulls arm 24 downward pulling link 22 down compressing spring 20 applying an upward force on the chassis at pin 28. This action compresses and loads spring 18 and supports the vehicle chassis 12 on left pivot pin 28 preventing that side of the chassis from dropping down under the influence of centrifugal forces imposed by the vehicle moving through the turn. Referring now to the left side of FIG. 2, it will be seen that right hand bell-crank 26 (from driver's view) has rotated clockwise pushing link 22 upward resulting in unloading the spring and a lowering of the right-hand pin 28 and the body or chassis on the right side relative to the axle of the vehicle. This results in a loading of the left hand spring and increase in upward force on the chassis on the left side relative to the axle thereby imposing a up force to the left pivot connection 28 of the levers 26. Simultaneously an inertial or centrifugal force will be imposed to the left on the chassis attempting to roll it to the left about its roll axis as it moves through the turn. The suspension as described will resist the roll of the chassis about its roll axis as a result of the steering input to the suspension.

While the above system has been described and illustrated as applied to a McPherson suspension on the front of a vehicle, it should be understood that it is not so limited. The system may also be applied to other strut suspensions including the double wishbone type. The system may also be applied to the rear of a vehicle through appropriate connection as will be described.

It will be appreciated that the previously suspension system as described is applied only to the front of the vehicle and in most cases will be adequate for the purpose of maintaining the vehicle chassis substantially level in a turn. It is also apparent that the leveling effect will only be truly effective when the system is adjusted for a particular range of speeds and radius of turn. For example, when slower than designed for, it will tend to lean or tilt into the turn. When the speed exceeds the design speed, the chassis will tend to roll beyond the level condition. The present system is a compromise between the expensive systems of the prior art and conventional suspension systems with no true compensation.

Figure 4:
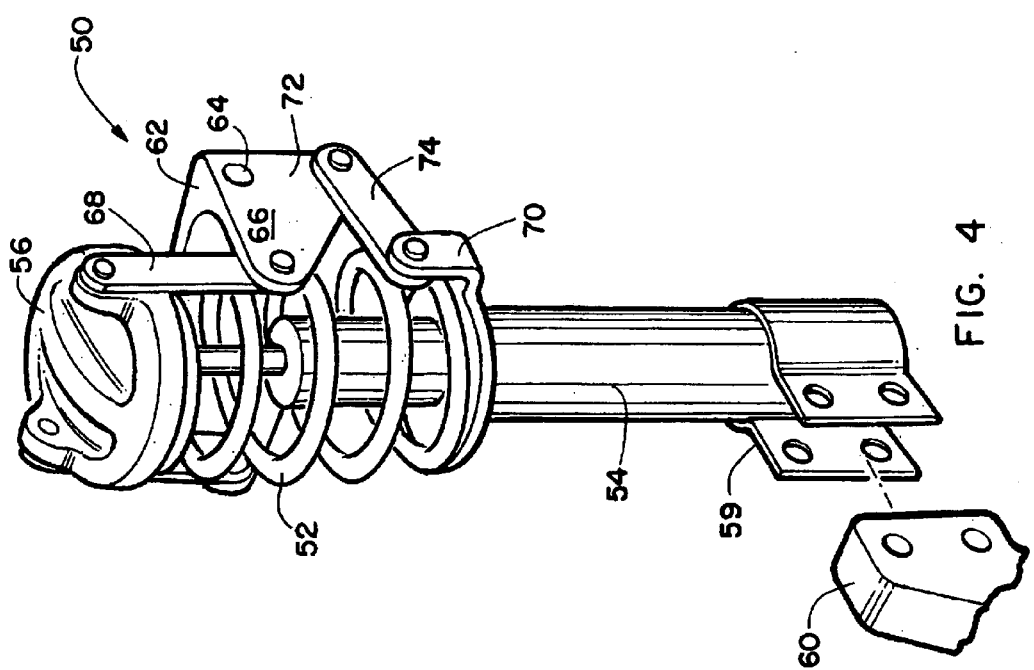
FIG. 4 is a detailed perspective view of one side of another embodiment similar to that of FIG. 3, with a modified form of steering input from the strut housing ion to the spring.

FIG. 4 illustrates a perspective view of an alternate embodiment of the steering to suspension system linkage of the present invention. A McPherson strut assembly designated generally at 50 comprises a combination spring 52 and a damper or shock absorber 54 connected together by a plate 56 at the top. A bracket 59 at the lower end of the assembly detachably attaches to an axle hub 60. The main body of the strut rotates during steering or turning of the wheels of the vehicle. A bell crank 62 pivotally attaches at 64 to a vehicle chassis. The bell crank has at least one arm 66 connected by a link 68 to the cap 56. An arm 70 on the housing of strut 50 is connected to a lower arm 72 of bell crank 62 by a link 74 to translate rotary movement of the strut to pivotal movement of bell crank 62. This movement resulting from steering of the vehicle loads the spring 52 of the suspension on the outside of the turn. The illustrated assembly is for a right hand front wheel so that a left turn of the vehicle rotates the strut in a clockwise direction resulting in loading of the down load side spring when in a turn. This embodiment provides a simple modification to many existing small domestic and foreign vehicles.

Figure 5:
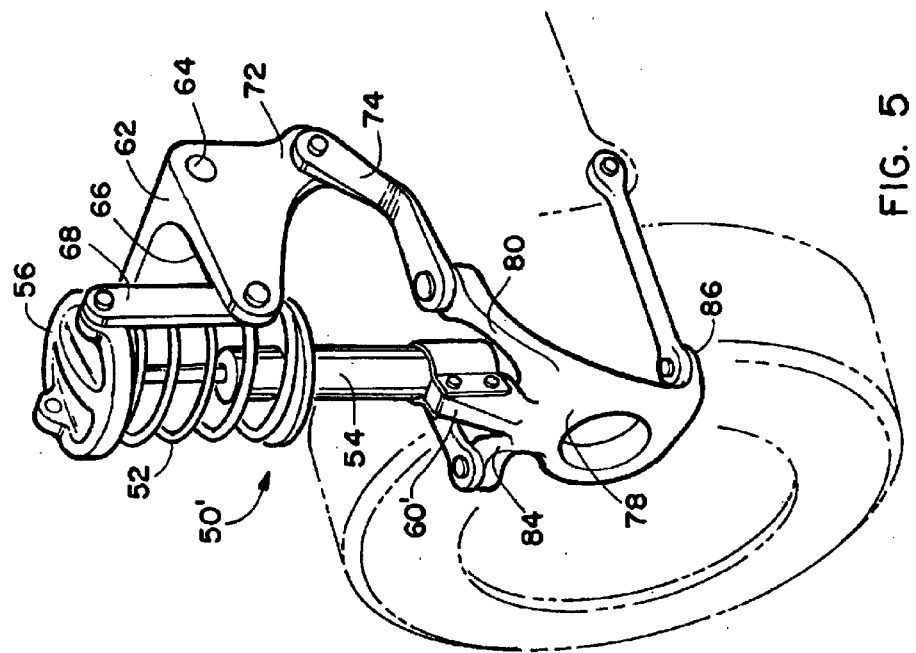
FIG. 5 is a perspective view of one side of a further embodiment similar to that of embodiment of FIG. 1 illustrating details of an axle hub modification.

Referring to FIG. 5, another embodiment is illustrated that provides a relatively simple modification to existing small domestic and foreign automobiles. In this embodiment, the same parts will be identified by the same reference numbers and the equivalent part with minor modification will be identified with the same number primed. As illustrated a strut assembly substantially as in the prior embodiment is illustrated with substantially the same linkage assembly. In this embodiment, a modified hub 78 is provided which may be substituted for the hub on many present automobiles. The hub includes an arm 80 that is connected to link 74 and provides the steering input to the compensating linkage. The hub otherwise has the standard structure with a strut attachment bracket 60' and a lower control arm bracket 82. A steering input arm 84 receives steering input from the steering wheel of the vehicle. The illustrated embodiment is that of a right front wheel. When the vehicle is steered to the left, the wheel is turned counterclockwise about a vertical axis coincident with that of the strut. This actuates the linkage to depress or load the spring 52 50 that it supports the load of the chassis as it attempts to roll to the outside of a turn. The linkage assembly of the opposite wheel unloads that spring and lowers the chassis on the inside or upload side of the turn. The chassis is thus held substantially level as the vehicle negotiates a turn.

Figure 6:
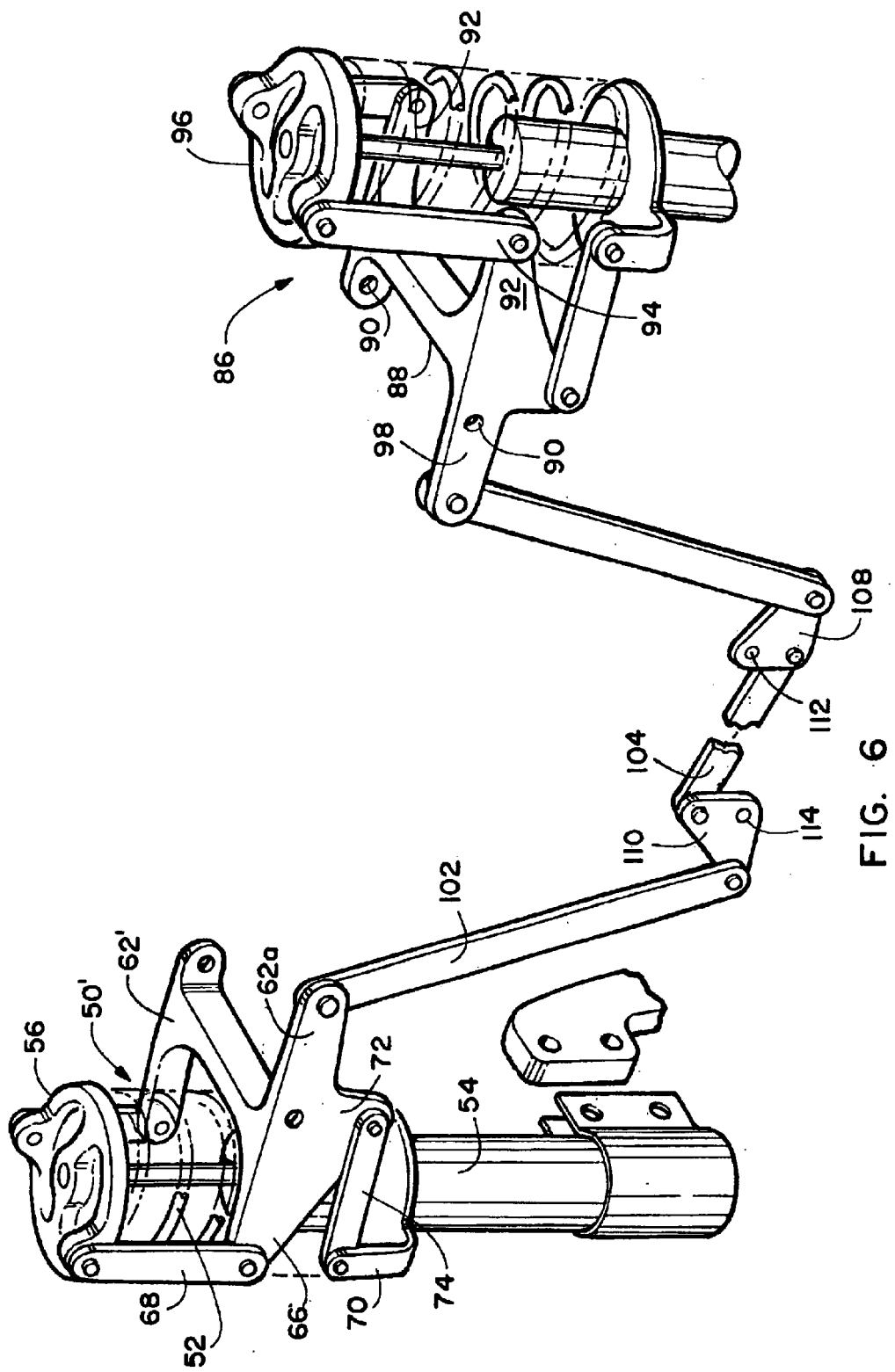
FIG. 6 is a perspective view of one side of still another embodiment similar to that of FIG. 4 illustrating a linkage interconnection between the front and the rear suspension of a vehicle.

While a front assembly may be adequate to counter the roll of a vehicle chassis in most instances, it may be desirable to include the rear suspension in the compensation system. As illustrated in FIG. 6, a linkage is shown that translates the steering input from the front of the chassis to the rear suspension. This may be accomplished by either linkage, cable or other means such as hydraulics. A simple linkage system is illustrated connecting the front and rear suspension to receive input from the steering of the vehicle. As illustrated a front suspension substantially identical to that of FIG. 4 has a lever or bell crank 62' modified to include an arm 62a connected through a linkage to a rear McPherson strut suspension designated generally at 86. The rear strut is substantially identical to that of the front and attached to a wheel and axle assembly in a conventional manner not shown. The strut 86 is like strut 50' except that steering input is through a lever 88 pivotally mounted at 90 to the chassis. Lever 88 has two arms 92 connected through links 94 to plate or cap 96 of the strut. An arm 98 is connected through a linkage system having links 100 and 102 connected together by a link 104 and bell cranks 108 and 110 which are pivotally attached to the chassis. Bell cranks 108 and 110 are each pivotally attached to the chassis at 112 and 114 respectively. The illustrated system is for the right side of a vehicle. The opposite side of the vehicle will have an identical linkage system connecting the front and rear McPherson suspensions to function together in response to a steering input to maintain the vehicle chassis substantially lever when passing through a turn.

In operation, with reference to the right hand wheel and axle assembly as viewed from FIG. 6, movement of the steering wheel of the vehicle to move it into a right hand turn, from the driver's point of view, will rotate the strut in a clockwise direction about its vertical axis. This will move steering arm 70 and link 74, turning the axle assembly clockwise about its vertical axis. This turning of the axle assembly moves steering input link 74 forward acting on lower arm 72 of bell-crank 62 rotating it clockwise about pivot 64. This rotation pushes arm 66 upward pushing link 68 up extending spring 52 applying a downward force on the chassis at pin 64. This action simultaneously compresses and loads the spring on the opposite side of the chassis (not shown) and supports the vehicle chassis preventing that side of the chassis from dropping down under the influence of centrifugal forces imposed by the vehicle moving through a right turn.

This action on strut 50' is translated through linkage 102, 104, 100 to the same motion on rear strut 86 on the same side of the chassis. As shown in FIG. 6, it will be seen that as right hand bell-crank 62 has rotated clockwise pushing link 68 upward resulting in unloading the spring and a lowering of the right-hand pin 64 and the body or chassis on the right side relative to the axle of the vehicle. This results in arm 62a moving upward pulling link 102 upward and rotating bell crank 110 clockwise. This moves link 104 to the right rotating bell crank 108 clockwise about its pivot 112 pulling link 100 and arm 98 downward. This lowers the chassis support on pin 90 and allows the strut to expand upward reducing its support of the chassis on the upload on inside of the turn thereby maintaining the chassis substantially lever when in a turn.

Figure 7:
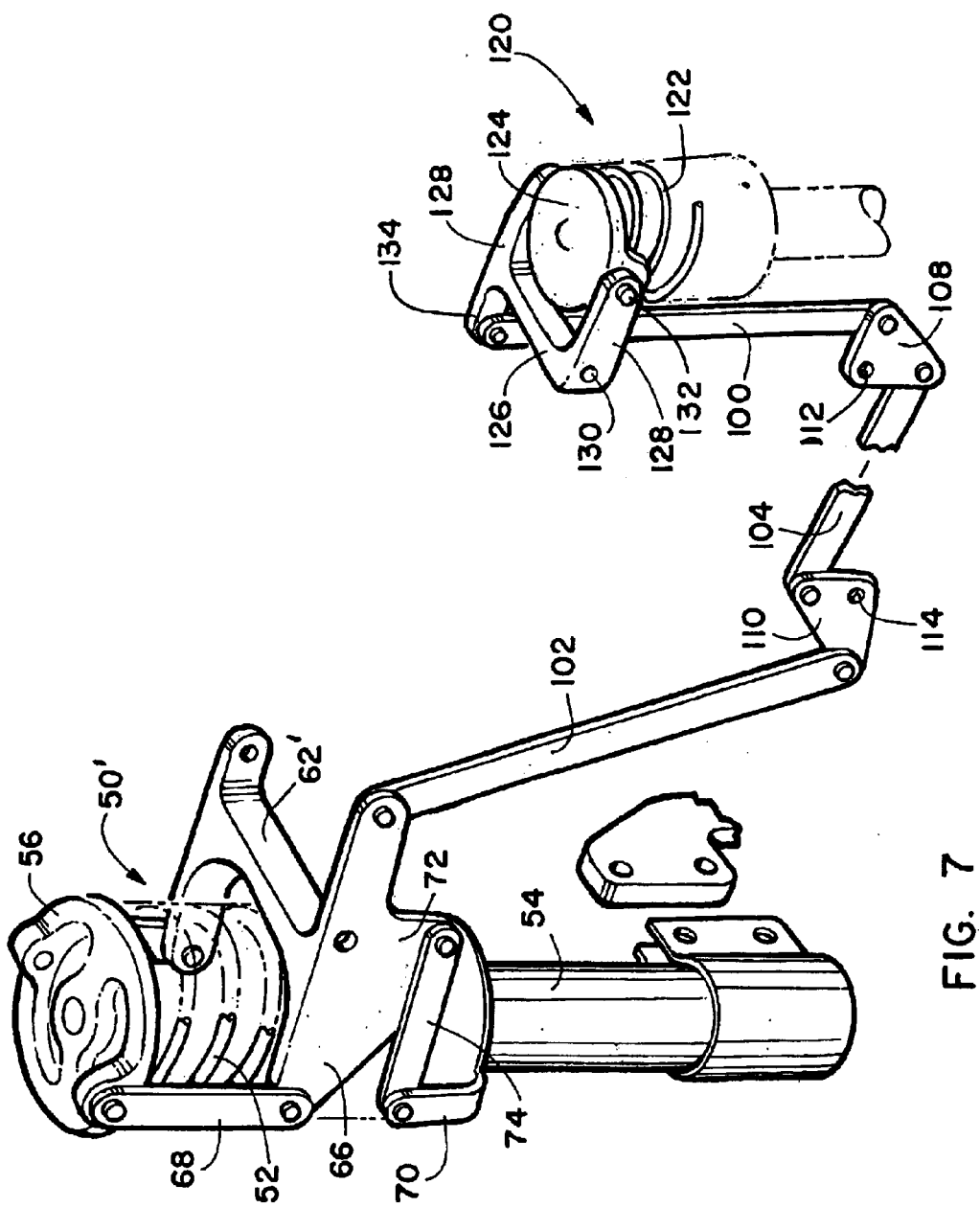
FIG. 7 is a view like FIG. 6 showing of a still further embodiment of the rear suspension in a static condition.

Illustrated in FIG. 7, a front suspension substantially identical to that of FIG. 6 has a lever or bell crank 62' having an arm 62a connected through a linkage system to a modified rear strut suspension designated generally at 120. The rear strut may be substantially identical to that of the front or it may be an average spring and attached to a wheel and axle assembly in a conventional manner not shown. The strut or spring 122 has a cap 124 to which a lever 126 is directly connected. Lever 126 is pivotally mounted at 130 to the chassis. Lever 126 has two arms 128 connected directly through pivot pins 132 directly to plate or cap 124 of the strut. An arm 134 is connected by link 100 through the linkage system to the front system as previously described.

In the instant system the linkage serves to translate a movement of the steering and the moveable arm of the axles of the suspension system to a vertical force on the down force side of the chassis so that the anti-roll linkage simultaneously lifts the down force side of the chassis and lowers the up force side.

While certain preferred embodiments have been described above, it is to be understood that a latitude of modification and substitution is intended in the foregoing disclosure, and that these modifications and substitutions are within the literal scope, or are equivalent to, the claims that follow.

Accordingly, it is appropriate that the following claims be construed broadly and in a manner consistent with the spirit and scope of the invention herein described.

What is claimed is:

1. An anti-roll suspension system for a vehicle, the suspension comprising:

a steerable axle assembly for rotatably mounting at least a pair of laterally spaced wheels on a vehicle chassis;

a spring assembly supporting the chassis on each of the axle assemblies;

a lever attaching each spring assembly of each axle assembly to the vehicle chassis; and a roll compensating linkage connected to said lever of each spring assembly of the suspension system and being responsive to a steering movement to said chassis to translate the steering movement to a vertical movement on the suspension of the chassis to simultaneously lift the outside turn side of the vehicle and lower the inside turn side of the vehicle thereby counteracting roll of the chassis when in a turn.

2. An anti-roll suspension according to claim 1 wherein said lever is pivotally mounted to said chassis and having one arm connected by a first link to a top portion of said spring assembly, and a second arm connected to a second link receiving said steering input force.

3. An anti-roll suspension according to claim 2 wherein said spring assembly embodies a McPherson strut.

4. An anti-roll suspension according to claim 2 wherein said lever is a bell crank having a third arm connected by a third link to a third arm of a bell crank of the other spring assembly.

5. An anti-roll suspension according to claim 2 wherein said second link is connected to a lower portion of said axle assembly and transfers steering movement of said axle assembly to said bell crank.

6. An anti-roll suspension according to claim 5 wherein spring assembly embodies a McPherson strut and said second link is connected to a lower portion of said McPherson strut.

7. An anti-roll suspension according to claim 6 wherein said lever is a bell crank having a third arm connected by a third link to a third arm of a bell crank of the other spring assembly.

8. An anti-roll suspension according to claim 2 wherein said lever is a bell crank having a second arm connected by said second link to a second arm of a bell crank of the other spring assembly and said steering input is an arm on said strut.

9. An anti-roll suspension according to claim 1 further comprising:

a spring assembly supporting the chassis on each of a pair of rear axle assemblies;

a lever attaching each spring assembly of each rear axle assembly to the vehicle chassis; and said roll compensating linkage connected to said lever of each rear spring assembly of the suspension system and being responsive to a steering movement to said chassis to translate the steering movement to a vertical movement on the suspension of the chassis to simultaneously lift the outside turn side of the vehicle and lower the inside turn side of the vehicle thereby counteracting roll of the chassis when in a turn.

10. An anti-roll suspension according to claim 9 wherein each spring assembly embodies a McPherson strut.

11. An anti-roll suspension according to claim 10 wherein said laterally spaced wheels are maintained at a substantially constant camber when said vehicle chassis is in a turn.

12. An anti-roll suspension according to claim 1 wherein said laterally spaced wheels are maintained at a substantially constant camber when said vehicle chassis is in a turn.

13. A steering controlled anti-roll suspension system for a vehicle, the suspension comprising:

a steer able axle assembly for rotatably mounting each of a pair of laterally spaced wheels on a vehicle chassis;

a spring assembly supporting the chassis on each of the axle assemblies;

a lever pivotally attached to the chassis and attaching each spring assembly to the vehicle chassis; and a roll compensating linkage connected to receive a steering input to an axle assembly and to said lever of each spring assembly of the suspension system and being responsive to said steering input to said axle assembly to translate the steering movement to a vertical movement on the suspension of the chassis to simultaneously lift the outside turn side of the vehicle and lower the inside turn side of the vehicle thereby counteracting roll of the chassis when in a turn.

14. An anti-roll suspension according to claim 13 wherein said lever is pivotally mounted to said chassis and having one arm connected by a first link to a top portion of said spring assembly, and a second arm connected to a second link receiving steering input force.

15. An anti-roll suspension according to claim 14 wherein said spring assembly embodies a McPherson strut.

16. An anti-roll suspension according to claim 15 wherein said lever is a bell crank having a third arm connected by a third link to a third arm of a bell crank of the other spring assembly.

17. An anti-roll suspension according to claim 16 wherein said second link is connected to a portion of said axle assembly and transfers steering movement of said axle assembly to said bell crank.

18. An anti-roll suspension according to claim 17 wherein spring assembly embodies a McPherson strut and said second link is connected to a lower portion of said McPherson strut.

19. An anti-roll suspension according to claim 18 further comprising:

a spring assembly supporting the chassis on each of a pair of rear axle assemblies;

a lever pivotally attached to the chassis and attaching each spring assembly to the vehicle chassis; and said roll compensating linkage connected to said lever of each rear spring assembly of the suspension system and being responsive to a steering movement to said chassis to translate the steering movement to a vertical movement on the suspension of the chassis to simultaneously lift the outside turn side of the vehicle and lower the inside turn side of the vehicle thereby counteracting roll of the chassis when in a turn.

20. A steering controlled anti-roll suspension system for a vehicle, the suspension comprising:

a steer able axle assembly embodying a McPherson strut for rotatably mounting each of a pair of laterally spaced wheels on a vehicle chassis;

a bell crank lever attaching each spring of each axle assembly to the vehicle chassis, said lever is pivotally mounted to said chassis and having one arm connected by a first link to a top portion of said spring assembly, and a second arm connected to a second link receiving steering input; and a roll compensating linkage connected to said lever of each spring of each axle assembly of the suspension system and being responsive to a steering movement to said chassis to translate the steering movement to a vertical movement on the suspension of the chassis to simultaneously lift the outside turn side of the vehicle and lower the inside turn side of the vehicle thereby counteracting roll of the chassis when in a turn.

* * * * *